Figure 2:
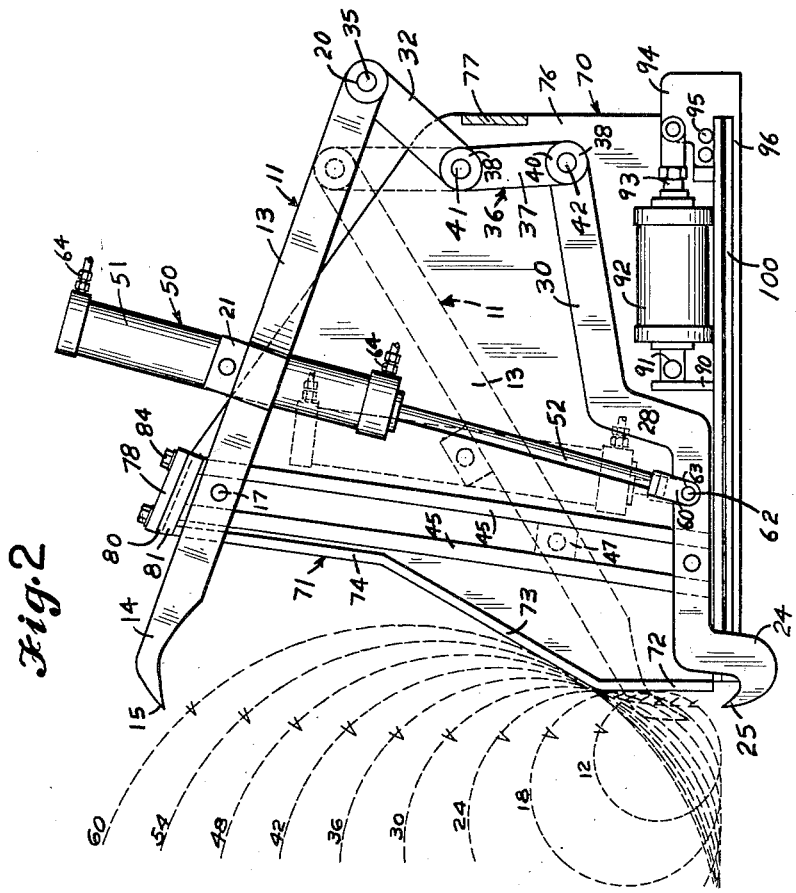

Jan. 1, 1963  L. PEASE ET AL  3,071,170
SELF-CINCHING TONG DOGS FOR SAWMILLS
Filed July 27, 1959  3 Sheets-Sheet 1

INVENTORS
Lionel R. Pease
James R. Wells
BY
T W Secrest
ATTORNEY

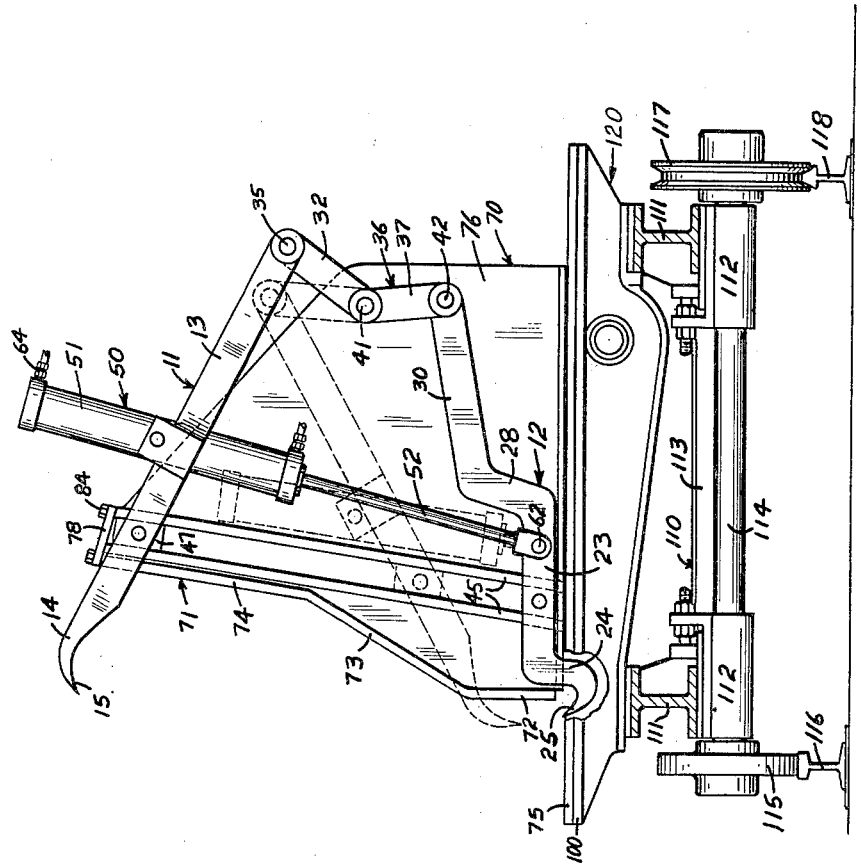
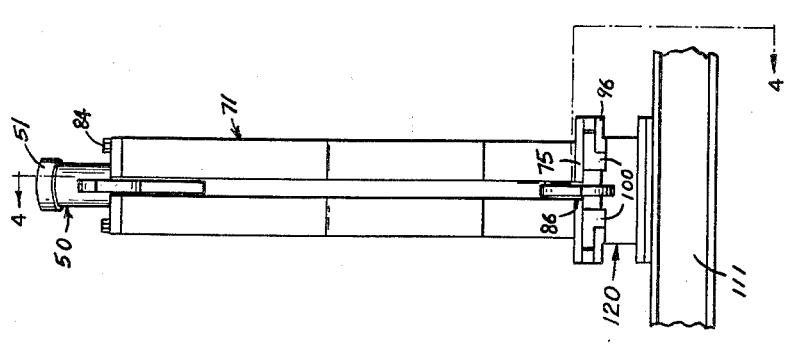
INVENTORS
Lionel Pease
James R. Wells
BY
T W Secrest
ATTORNEY

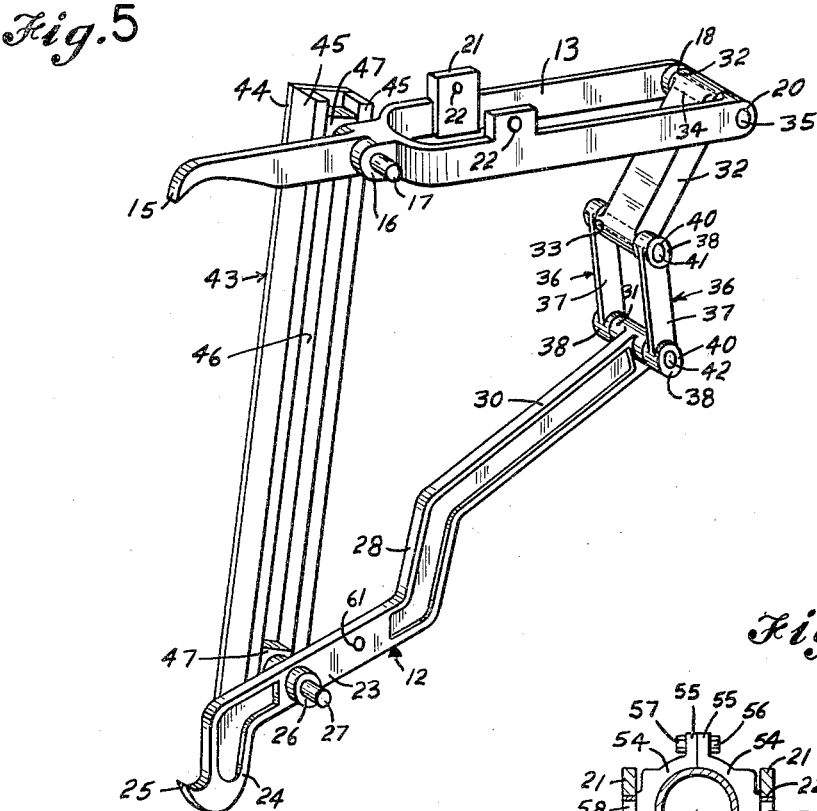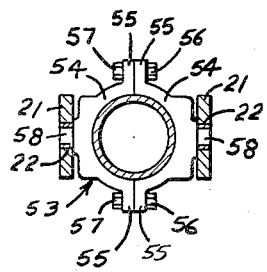

United States Patent Office 3,071,170
Patented Jan. 1, 1963

3,071,170
SELF-CINCHING TONG DOGS FOR SAWMILLS
Lionel Pease and James R. Wells, Seattle, Wash.
Filed July 27, 1959, Ser. No. 829,675
5 Claims. (Cl. 143—125)

This invention is directed to self-cinching tong dogs wherein the upper dog and the lower dog can be drawn toward each other in a predetermined path, and the invention is also directed to the combination of the self-cinching tong dogs and a knee for positioning a log on a carriage.

One of the objects of this invention is the provision of the combination of self-cinching tong dogs and a knee wherein the knee is of a configuration to receive with equal facility logs of various sizes and the tong dogs can operate effectively on the logs of various sizes.

Another object is the mounting of the upper dog arm on a floating fulcrum so that the dog moves in a curved path for biting into logs and cants of various thicknesses.

An essential object of the present invention is the provision of dogs or spuds and operating mechanism therefor, whereby the dogs may be positioned and operated at will to engage with equal effectiveness either the upper and lower edges of the last or backing board, a round log, or a portion of a log to be held in particular relation to the knee to permit quarter sawing.

Another object is the provision of a sawmill carriage dogging apparatus having relatively few moving parts and being relatively accessible for repair.

A still further object is the provision of a sawmill dogging apparatus wherein the dogs engage cants of various sizes and contours without being projected excessively beyond the face of the knee.

An additional object of this invention is to provide sawmill dogging apparatus wherein means are provided for directing the path of the dogs relative to the face of the carriage knee, and for withdrawing the dogs away from the saw line.

A further object is the provision of remote controlled tong dogs which can be controlled by an operator off of the sawmill carriage.

Another object is to provide self-cinching tongs which are operated by a single fluid operated cylinder for both dogging and cinching.

A still further and important object is the provision of dogging mechanism which is relatively inexpensive to manufacture and to maintain in operation.

These and other important objects and advantages will be more fully brought forth from the written specification, drawings and the appended claims.

Figure 1:
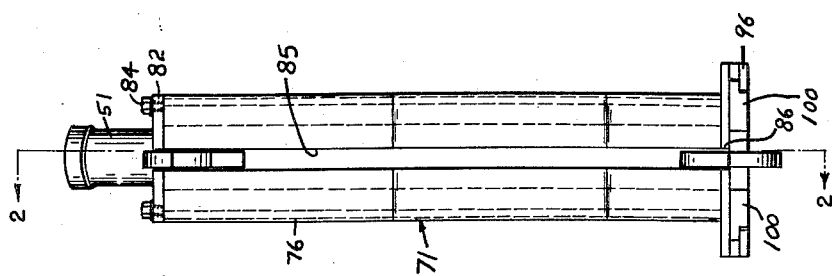

In the drawings:

FIGURE 1 is a front elevation view of the invention and shows the dogs in a spread-apart configuration.

FIGURE 2, taken on line 2—2 of FIGURE 1, is a fragmentary side elevation view of a specific embodiment of the invention constructed in accordance with the preferred teachings, and illustrates, in phantom, the diameter of logs in inches and the position of these logs with respect to the knee and the bite of the tong dogs in these logs.

FIGURE 3 is a front elevation view of the invention mounted on a sawmill carriage.

FIGURE 4, taken on line 4—4 of FIGURE 3, is a fragmentary side elevation view of the invention with one guard plate removed so as to more clearly show the linkages in the dogging mechanism.

FIGURE 5 is a perspective view of the upper tong dog, bottom tong dog, guide and the links; and FIGURE 6 is a view of trunnion used for positioning a fluid cylinder between legs on a dog.

Referring to the drawings it is seen that the invention comprises self-cinching tong dogs having an upper dog 11 and a lower dog 12. The upper dog comprises a U-member having legs 13 and a tine 14. The tine 14 in its lower edge and near the tip curves inwardly to define a biting point 15. At the juncture of the tine and the U-member and on each side is a hub 16. Projecting horizontally outwardly from each hub 16 is a guide stud 17.

At the free end of each leg and on the inward face is a hub 18. In each hub is a drilled passageway 20 for receiving a shaft or pin. Near the base of each leg 13 and attached to the inner face is a trunnion block 21 having a drilled passageway 22 therethrough.

The bottom tong dog comprises a base member 23 which on its free end depends downwardly into a finger 24. The finger 24 curves upwardly into biting tooth 25. On each vertical face of the base member 23 is a hub 26. Projecting horizontally outwardly from each hub 26 is a guide stud 27.

On its inner end the base member 23 curves upwardly to form intermediate member 28. This intermediate member in turn curves into upwardly sloping member 30. This member 30 at its free end has on each face a hub 31. A drilled passageway not shown, runs through this hub and the member.

There is provided a solid link 32 having on each end and on each side of each end a hub 33. Running through the hubs on each end and the link itself is a drilled passageway 34 for receiving a pin or shaft.

A pin 35 is in the passageways 20 in the legs 13 and in the passageway 34 in the link 32.

Interconnecting the link 32 and the bottom tong dog 12 are two links 36. Each of these links comprises a shank 37. On each end of the shank and on each face is a hub 38. In each hub and shank is a drilled passageway 40.

The upper hub 38 associated with the link 32 is seated so that it is free to rotate but is not free to move. The seat, not shown, for this hub is attached to the side frame members 76.

A pin 41 projects through passageways 40 and passageway 34 in the link 32 so as to connect these together. And a pin 42 is in passageways 40 and the passageway in the hub 31 in the bottom tong dog so as to connect these together.

There are two guides 43, one on each side of the dogs. These guides may be manufactured by cutting a groove in bar stock or may be fabricated from a flat backing strip 44 and two spaced-apart bars 45. These two bars are welded to the backing strip 44, and define a groove 46. In this groove are two guide blocks 47. In each guide block is a drilled opening, not shown, for receiving a stud 27. As is readily realized the guide block, stud and groove restrict to a degree the path of movement of the forward part of the two tong dogs.

Referring to FIGURE 2 the path of travel of the two dogs can be seen. With the two dogs spread apart as much as possible it is seen that the section 23 of the bottom dog is substantially level and that the links 36 are substantially vertical. In regard to the upper dog the link 32 slopes upwardly at an angle of about 45° and away from the guide 43. The upward movement of the lower dog is limited due to the logs. However, upon moving upwradly the biting tooth 25 moves in the path of an arc and swings inwardly. The link 36 rotates around the pin 41 and towards the guide 43, but only through a small angle.

With the downward movement of the upper dog the link 32 rotates upwardly around the shaft 41 and towards the guide 43. The biting point 15 on moving downwardly moves in a curve so that it curves outwardly and then curves inwardly. An inherent advantage is that the upper dog does not bite into the smaller logs to a very large degree thereby making it possible to saw more of the log.

To draw together and to move apart the two dogs is a fluid pressure cylinder 50 having a barrel 51 and a plunger rod 52. The barrel is connected to the upper dog by means of a trunnion 53 (FIG. 6). As a trunnion is well-known in the art it does not form part of this invention. This trunnion has two semicylindrical members 54 which in combination encircle the barrel 51. These members 54 have ears 55 and which ears are drilled to receive bolts 56. A nut 57 on the bolt 56 clamps together the members 54. On each member 54 is a stud 58. This stud 58 cofits with the passageway 22 in the trunnion block 21 positioned on the upper tong dogs. From this presentation it is seen that it is possible to set the maximum opening between the two dogs by positioning the barrel 51 in the trunnion 53.

The plunger rod 52 connects with the lower dog by means of a clevis 60. In the section 23 of the lower dog is a drilled hole 61 (FIG. 5). A pin 62 projects through holes 63 in the clevis 60 and the hole 61.

Attached to the cylinder 50 are coupling fittings 64.

These dogs are used in combination with a knee 70. This knee comprises two spaced-apart identical members 71. These two members are actually positioning members and bearing members for logs. The members, although continuous, may be considered to be composed of three sections. There is a vertical lower section 72; an inwardly and upwardly sloping middle section 73; and an inwardly and upwardly sloping upper section 74. The lower section is approximately 20-25% by height of the total height of the knee. The middle section slopes upwardly at a vertical angle of approximately 60° and is about 40-45% by height of the total height of the knee. And, the upper section is substantially vertical and slopes upwardly at a vertical angles of approximately 80-85° and is about 35-40% of the total height of the knee.

Supporting structure for the dogs comprises suitable framework such as two spaced-apart base plates 75 (FIGS. 3 and 4). These base plates are welded to side frame members 76. The front edge of the frame member conforms to the configuration of the knee, and is welded to the side of the knee. The side member 76 slopes downwardly from the leading edge at the knee until it is slightly in back of the pin 41 at which position it drops vertically down.

The backs of the two frame members are joined by a tie bar 77 (FIG. 2) welded to the members.

The apex of the two frame members are joined by a tie bar 78. At the apex and welded to the inside of the frame member is an angle lug having horizontal leg 80 and vertical leg 81. The tie bar has drilled two passageways 82 on each end and the horizontal leg 80 has aligned tapped openings 83 for receiving bolts 84.

In addition to this reinforcing structure the guides 43 are welded to the frame members.

The spaced knees 71 define a slot 85 in which the upper and lower dogs can move up and down. The spaced-apart base plates 75 define a slot 86 in which the lower dog can move.

In order to accommodate the knee and dogs to a log on a carriage there is provided tapering means. On the upper face of the base plates 75 and somewhat in back of the center is welded an upright lug 90. Attached to this lug by means of a piston rod 91 is a fluid pressure cylinder 92. This cylinder on its other end connects by means of a piston rod 93 to a bracket 94 which is attached by rivets 95 to frame members 76. The bracket is welded at the rear to a tie member 96.

Between the base plate 75 and the member 96, and on the outside edge, is a spacer 97. This spacer is of less width than the tie member 96. The base plate, spacer and tie member are drilled to receive a bolt and nut 98. Positioned underneath the base plate 75 and somewhat between the base plate 75 and the tie member 96 is a gib 100. The knee and dog combination slides back and forth on this gib.

The mounting of the knee and dog combination on a sawmill carriage 110 is illustrated in FIGURE 4. This carriage comprises longitudinal frame members 111 attached to shaft housings 112. These housings are tied together by tie bar 113. A shaft 114 runs through the housing 112. Mounted on one end of the shaft 114 is a wheel 115 which rides on rail 116. On the other end of the shaft 114 is a guide wheel 117 which rides on guide rail 118. The guide wheel has a V-groove for cofitting with the guide rail which presents a V-rail. Positioned on the frame members 111 is a head block 120. As is well-known the sawmill carriage reciprocates back and forth on the rails so as to enable the saw to cut the log.

Referring again to the combination of the dogs 11 and 12 and the knee 71 it is seen that for logs of relatively small diameter such as thirty inches and under that the log is positioned mainly by the lower section 72 of the knee. This section of the knee prevents the sideways movement of the log. The upper and lower dogs so function that the lower dog bites into only a small part of the log and the upper dog bites into only a small part of the log. For larger logs the log is positioned by and bears against the middle section 73. As is seen the inward slope of the section 73 makes it possible for this knee to accommodate the log. The upper dog bites into the log so as to push it down and into the knee. To more firmly position the log the lower dog rises and bites into the underneath part. Even though the log overlies the section 73 the upper dog bites into only a relatively small part of the log thereby making it possible to safely position the majority of the log for sawing.

From the foregoing specification it is seen that there is presented the combination of a knee and dogs wherein the knee is adapted to accommodate logs of various sizes ranging from small to extremely large. Also, the path of travel of the biting point of the dog is such that with the decreasing diameter of the log the upper dog swings inwardly so as to bite a relatively small part of the log. Furthermore, it is seen that one fluid pressure cylinder can be employed to pull together and to force apart the dogs and which results in one cylinder doing the work of two cylinders. Also in my invention there are fewer wear points as there are only, strictly speaking, seven wear pins, i.e., 27, 17, 58, 35, 41, 42 and 62, which means less maintenance.

Having thus described our invention we claim as new and desire to secure by Letters Patent:

1. A combination of a knee and a dogging apparatus, said knee having a bearing face, said face having a lower section, a middle section and an upper section, said lower section being substantially vertical, said middle section sloping upwardly and away from the lower section to provide a reclining bearing surface, said upper section rising upwardly, said lower section providing a bearing surface to limit horizontal movement of a log, said middle section providing a bearing surface to limit horizontal movement of and a seating surface to support a log, said dogging apparatus having an upper dog and a lower dog, said upper dog having a first floating-pivot point, a first means to restrict the travel of the first floating point to a rectilinear path, said first means being juxtapositioned with respect to the knee and being positioned on the non-bearing side of the knee, a second means to restrict the path of the upper dog, said second means being in a floating relationship with respect to the upper dog, said upper dog having a biting point, said first means being positioned between the biting point and the second means, said lower dog having a second floating-pivot point, a third means to restrict the travel of the second floating point to a rectilinear path, a fourth means to restrict the path of the lower dog, said fourth means being in a floating relationship with respect to the lower dog, said lower dog having a biting tooth, said third means being positioned between the biting tooth and the fourth means, and means to move the upper dog and the lower dog toward each other.

2. A combination of a knee and a dogging apparatus, said knee having a bearing face, said face having a lower section, a middle section and an upper section, said lower section being substantially vertical, said middle section sloping upwardly and away from the lower section to provide a reclining-bearing surface, said upper section rising upwardly, said lower section providing a bearing surface to limit horizontal movement of a log, said middle section providing a bearing surface to limit horizontal movement of and a seating surface to support a log, said dogging apparatus comprising an upper dog and a lower dog, said upper dog having a biting point and said lower dog having a biting tooth, a rectilinear guide, said guide being juxtapositioned with respect to the knee and being positioned on the non-bearing side of the knee, said guide being substantially vertical but sloping away from the lower section of the knee upon rising upwardly, said upper dog being connected to a first link, said lower dog being connected to a second link, said first and said second links being connected to each other, a first guide follower on said upper dog, said first guide follower being positioned between the biting point and the first link, a second guide follower on said lower dog, said second guide follower being positioned between the biting tooth and the second link, said first guide follower coacting with said rectilinear guide, said second guide follower coacting with said rectilinear guide, said first dog and biting point projecting beyond the bearing face of the knee so as to be able to bite into a log, said second dog and biting tooth projecting beyond the bearing face of the knee so as to be able to bite into a log, and means to draw together and to force apart the upper dog and the lower dog.

3. A combination of a knee and a dogging apparatus, said knee having a bearing face, said face having a lower section, a middle section and an upper section, said lower section being substantially vertical, said middle section sloping upwardly and away from the lower section to provide a reclining bearing surface, said upper section rising upwardly, said lower section providing a bearing surface to limit horizontal movement of a log, said middle section providing a bearing surface to limit horizontal movement of and a seating surface to support a log, said lower section being approximately 20–25 percent the height of the knee, the middle section being approximately 40–45 percent the height of the knee, and the upper section being approximately 35–40 percent the height of the knee.

4. A combination of a knee and a dogging apparatus, said knee having a bearing face, said face having a lower section, a middle section and an upper section, said lower section being substantially vertical, said middle section sloping upwardly and away from the lower section to provide a reclining-bearing surface, said upper section rising upwardly, said lower section providing a bearing surface to limit horizontal movement of a log, said middle section providing a bearing surface to limit horizontal movement of and a seating surface to support a log, said dogging apparatus comprising an upper dog and a lower dog, said upper dog having a biting point and said lower dog having a biting tooth, a rectilinear guide, said guide being juxtapositioned with respect to the knee and being positioned on the non-bearing side of the knee, said guide being substantially vertical but sloping away from the lower section of the knee upon rising upwardly, said upper dog being connected to a first link, said lower dog being connected to a second link, a first guide follower on said upper dog, said first guide follower being positioned between the biting point and the first link, a second guide follower on said lower dog, said second guide follower being positioned between the biting tooth and the second link, said first guide follower coacting with said rectilinear guide, said second guide follower coacting with said rectilinear guide, said first dog and biting point projecting beyond the bearing face of the knee so as to be able to bite into a log, said second dog and biting tooth projecting beyond the bearing face of the knee so as to be able to bite into a log, and means to draw together and to force apart the upper dog and the lower dog so that the upper dog travels in a curvilinear path.

5. A combination of a knee and a dogging apparatus, said knee having a bearing face, said face having a lower section, a middle section and an upper section, said lower section being substantially vertical, said middle section sloping upwardly and away from the lower section at a vertical angle of approximately 60° to provide a reclining bearing surface, said upper section rising upwardly at a vertical angle of approximately 80–85°, said lower section providing a bearing surface to limit horizontal movement of a log, said middle section providing abearing surface to limit horizontal movement of and a seating surface to support a log, said lower section being approximately 20–25 percent the height of the knee, the middle section being approximately 40–45 percent the height of the knee, and the upper section being approximately 35–40 percent the height of the knee.

References Cited in the file of this patent

UNITED STATES PATENTS

| | | |
|---|---|---|
| 424,347 | Payette | Mar. 25, 1890 |
| 1,637,907 | Langill et al. | Aug. 2, 1927 |
| 1,781,220 | Ferris | Nov. 11, 1930 |
| 1,840,846 | Martin | Jan. 12, 1932 |
| 1,930,004 | Ferris | Oct. 10, 1933 |
| 2,633,879 | Andrus | Apr. 7, 1953 |

FOREIGN PATENTS

| | | |
|---|---|---|
| 382,222 | France | Dec. 2, 1907 |